(12) United States Patent
Noda (10) Patent No.: US 6,532,300 B1
(45) Date of Patent: Mar. 11, 2003

(54) METHOD OF AUTOMATICALLY ANALYZING PATTERNS

(75) Inventor: Osamu Noda, Tokyo (JP)

(73) Assignee: Jeol Ltd., Tokyo (JP)

( * ) Notice: Subject to any disclaimer, the term of this patent is extended or adjusted under 35 U.S.C. 154(b) by 0 days.

(21) Appl. No.: 09/160,835

(22) Filed: Sep. 25, 1998

(30) Foreign Application Priority Data

Sep. 25, 1997 (JP) .............................................. 9-260028

(51) Int. Cl.⁷ ................................................. G06K 9/00
(52) U.S. Cl. ..................... 382/145; 382/201; 356/237.1; 356/239.3
(58) Field of Search ................................ 382/132, 108, 382/144, 181, 120, 201, 203, 145; 356/237.2, 72, 614, 237.3, 237.4, 501, 239.3; 250/310

(56) References Cited

U.S. PATENT DOCUMENTS

| | | | | |
|---|---|---|---|---|
| 4,858,157 A | * | 8/1989 | Murai et al. ................. | 382/154 |
| 5,265,174 A | * | 11/1993 | Nakatsuka ................... | 382/189 |
| 5,528,360 A | * | 6/1996 | Kohno ........................ | 356/431 |
| 5,777,901 A | * | 7/1998 | Berezin et al. ................ | 716/19 |
| 5,808,735 A | * | 9/1998 | Lee et al. ............... | 250/559.42 |
| 5,872,871 A | * | 2/1999 | Yokoyama et al. .......... | 382/173 |

OTHER PUBLICATIONS

"In–Line Inspection Scanning Electron Microscope JWS–7515 for Deep submicron Semiconductor Manufacturing", Kazuhiro Honda, *JEOL News,* vol. 32E, No. 1 (1996), pp. 52–54.

"EDS Analysis With Wafer Inspection SEM", Katsuhiro Ono et al., *SEMICON Korea 95*, Jan. 20, 1995, pp. 81–88.

* cited by examiner

Primary Examiner—Bhavesh Mehta
Assistant Examiner—Sheela Chawan
(74) *Attorney, Agent, or Firm*—Webb Ziesenheim Logsdon Orkin & Hanson, P.C.

(57) ABSTRACT

There is disclosed a method of automatically analyzing many repeating patterns. One typical pattern is first selected. On the typical pattern, analysis points, analysis methods and analysis conditions are determined. On the other patterns, automatic analysis is performed at points having the same positional relation as the analysis points determined on the typical pattern with the analysis methods and analysis conditions determined for the typical pattern.

9 Claims, 12 Drawing Sheets

COORDINATE TABLE

| NUMBER | COORDINATES | | | ANALYSIS SEQUENCE NUMBERS |
|---|---|---|---|---|
| | X | Y | Z | |
| ⋮ | ⋮ | ⋮ | ⋮ | ⋮ |
| i | $X_i$ | $Y_i$ | $Z_i$ | j, k |
| ⋮ | ⋮ | ⋮ | ⋮ | ⋮ |

(A)

| NUMBER | COORDINATES | | | ANALYSIS ? |
|---|---|---|---|---|
| | X | Y | Z | |
| 1 | $X_{10}$ | $Y_{10}$ | $Z_{10}$ | |
| 2 | $X_{20}$ | $Y_{20}$ | $Z_{20}$ | |
| ⋮ | ⋮ | ⋮ | ⋮ | |
| h | $X_{h0}$ | $Y_{h0}$ | $Z_{h0}$ | |
| ⋮ | ⋮ | ⋮ | ⋮ | |

(B)

| NUMBER | COORDINATES | | | ANALYSIS SEQUENCE NUMBERS |
|---|---|---|---|---|
| | X | Y | Z | |
| 1 | $X_{11}$ | $Y_{11}$ | $Z_{11}$ | s |
| 2 | $X_{12}$ | $Y_{12}$ | $Z_{12}$ | t |
| ⋮ | ⋮ | ⋮ | ⋮ | ⋮ |

ANALYSIS SEQUENCE TABLE

| NUMBER | ANALYSIS MODE NUMBERS | | |
|---|---|---|---|
| | (1) PROBE CONDITION | (2) SCAN MODE | (3) ANALYSIS FUNCTION |
| • | • | • | • |
| • | • | • | • |
| j | l | m | n |
| • | • | • | • |
| • | • | • | • |
| k | p | q | r |
| • | • | • | • |
| • | • | • | • |

*FIG.6*

ANALYSIS MODE TABLE

| NUMBER | ACC. VOLTAGE | PROBE CURRENT |
|---|---|---|
| • | • | • |
| • | • | • |
| l | 12kV | 1nA |
| • | • | • |
| • | • | • |
| p | 12kV | 0.1nA |
| • | • | • |
| • | • | • |

(A) PROBE CONDITIONS

| NUMBER | SCAN MODE | MAGNIFICATION & OTHERS |
|---|---|---|
| • | • | • |
| • | • | • |
| m | AREA ANALYSIS | x 1000 |
| • | • | • |
| • | • | • |
| q | POINT ANALYSIS | 1μm ⌀ |
| • | • | • |
| • | • | • |

(B) SCAN MODES

| NUMBER | ANALYSIS FUNCTION | ATTENDANT ITEMS |
|---|---|---|
| • | • | • |
| • | • | • |
| n | ROI | 1.4~1.6, 6.2~6.6keV |
| • | • | • |
| • | • | • |
| r | IDENTIFICATION | 60 SEC |
| • | • | • |
| • | • | • |

(C) ANALYSIS FUNCTIONS

*FIG. 7*

COORDINATE TABLE FOR LEARNING

| NUMBER | COORDINATES | | | ANALYSIS SEQUENCE NUMBERS |
|---|---|---|---|---|
| | X | Y | Z | |
| 0001 | $X_1$ | $Y_1$ | $Z_1$ | 0001 |

(1)

| NUMBER | COORDINATES | | | ANALYSIS SEQUENCE NUMBERS |
|---|---|---|---|---|
| | X | Y | Z | |
| 0001 | $X_1$ | $Y_1$ | $Z_1$ | 0001 |
| 0002 | $X_2$ | $Y_2$ | $Z_2$ | 0002 |

(2)

| NUMBER | COORDINATES | | | ANALYSIS SEQUENCE NUMBERS |
|---|---|---|---|---|
| | X | Y | Z | |
| 0001 | $X_1$ | $Y_1$ | $Z_1$ | 0001 |
| 0002 | $X_2$ | $Y_2$ | $Z_2$ | 0002, 0003 |

(3)

| NUMBER | COORDINATES | | | ANALYSIS SEQUENCE NUMBERS |
|---|---|---|---|---|
| | X | Y | Z | |
| 0001 | $X_1$ | $Y_1$ | $Z_1$ | 0001 |
| 0002 | $X_2$ | $Y_2$ | $Z_2$ | 0002, 0003, 0004 |

ANALYSIS SEQUENCE TABLE FOR LEARNING (1)

| NUMBER | ANALYSIS MODE NUMBERS | | |
|---|---|---|---|
| | (1) PROBE CONDITION | (2) SCAN MODE | (3) ANALYSIS FUNCTION |
| 0001 | | | |

(2)

| NUMBER | ANALYSIS MODE NUMBERS | | |
|---|---|---|---|
| | (1) PROBE CONDITION | (2) SCAN MODE | (3) ANALYSIS FUNCTION |
| 0001 | 0001 | | |

(3)

| NUMBER | ANALYSIS MODE NUMBERS | | |
|---|---|---|---|
| | (1) PROBE CONDITION | (2) SCAN MODE | (3) ANALYSIS FUNCTION |
| 0001 | 0001 | 0002 | |

(4)

| NUMBER | ANALYSIS MODE NUMBERS | | |
|---|---|---|---|
| | (1) PROBE CONDITION | (2) SCAN MODE | (3) ANALYSIS FUNCTION |
| 0001 | 0001 | 0002 | |
| 0002 | 0001 | 0002 | |

(5)

| NUMBER | ANALYSIS MODE NUMBERS | | |
|---|---|---|---|
| | (1) PROBE CONDITION | (2) SCAN MODE | (3) ANALYSIS FUNCTION |
| 0001 | 0001 | 0002 | |
| 0002 | 0001 | 0002 | |
| 0003 | 0003 | 0002 | |

(6)

| NUMBER | ANALYSIS MODE NUMBERS | | |
|---|---|---|---|
| | (1) PROBE CONDITION | (2) SCAN MODE | (3) ANALYSIS FUNCTION |
| 0001 | 0001 | 0002 | |
| 0002 | 0001 | 0002 | |
| 0003 | 0003 | 0002 | |
| 0004 | 0003 | 0004 | 0005 |

FIG.9

ANALYSIS MODE TABLE FOR LEARNING

| NUMBER | ACC. VOLTAGE | PROBE CURRENT |
|---|---|---|
| 0001 | 10kV | 0.1nA |

(A-1) PROBE CONDITIONS

| NUMBER | ACC. VOLTAGE | PROBE CURRENT |
|---|---|---|
| 0001 | 10kV | 0.1nA |
| 0003 | 10kV | 0.3nA |

(A-2) PROBE CONDITIONS

| NUMBER | SCAN MODE | MAGNIFICATION & OTHERS |
|---|---|---|
| 0002 | AREA ANALYSIS | x 500 |

(B-1) SCAN MODES

| NUMBER | SCAN MODE | MAGNIFICATION & OTHERS |
|---|---|---|
| 0002 | AREA ANALYSIS | x 500 |
| 0004 | POINT ANALYSIS | $10 \mu \phi$ |

(B-2) SCAN MODES

| NUMBER | ANALYSIS FUNCTION | ATTENDANT ITEMS |
|---|---|---|
| 0005 | QUALITATIVE ANALYSIS | 60 SEC |

(C) ANALYSIS FUNCTIONS

FIG.10

DISPLAY OF THE ANALYSIS PROCESS AFTER LEARNING

| NUMBER | COORDINATES | | | ANALYSIS SEQUENCE NUMBERS | ANALYSIS MODES | | | | ANALYSIS FUNCTION | ATTENDANT ITEMS |
|---|---|---|---|---|---|---|---|---|---|---|
| | X | Y | Z | | ACC. VOLTAGE | PROBE CURRENT | SCAN MODE | MAG. & OTHERS | | |
| 0001 | $X_1$ | $Y_1$ | $Z_1$ | 0001 | 10kV | 0.1nA | AREA | x 500 | | |
| 0002 | $X_2$ | $Y_2$ | $Z_2$ | 0002 | 10kV | 0.1nA | AREA | x 500 | | |
| | | | | 0003 | 10kV | 0.3nA | AREA | x 500 | | |
| | | | | 0004 | 10kV | 0.3nA | POINY | 10 $\mu\phi$ | QUALITATIVE | 60 SEC |

FIG.11

POSITIONS ON REPEATING PATTERNS

1st PATTERN  2nd PATTERN

· · ·   · · · h-th PATTERN

METHOD OF AUTOMATICALLY ANALYZING PATTERNS

FIELD OF THE INVENTION

The present invention relates to a method of automatically analyzing patterns and, more particularly, to automatic pattern analysis performed in a system comprising a wafer process-evaluating apparatus to which an x-ray analysis function is added.

BACKGROUND OF THE INVENTION

When a pattern on a semiconductor wafer is analyzed with a wafer process-evaluating apparatus, an analysis point is displayed on a monitor on the evaluating apparatus and manually brought into the center. Then, the accelerating voltage, the probe current, and the magnification are manually established. Also, the beam is manually focused. Preparations for an x-ray analysis are made manually. Then, the x-ray analysis is made to identify the object (e.g., a pattern on the wafer) under analysis. Where the positions of repeating patterns on chips of a wafer are analyzed, the analysis is performed again manually.

With the above-described prior art method, an object to be analyzed (e.g., a pattern) is displayed and then the process sequence is advanced to the next process step manually. This necessity has made it impossible to perform automatic analysis.

SUMMARY OF THE INVENTION

It is an object of the present invention to provide a method capable of automating pattern analysis.

This method is initiated by selecting one typical pattern from a multiplicity of repeating patterns. On the selected typical pattern, analysis points, analysis methods and analysis conditions are determined. Points on other patterns having the same positional relation as the analysis points determined for the typical pattern are automatically analyzed under the analysis conditions by the analysis methods determined for the typical pattern.

In the configuration of the present invention, if there exists repeating patterns, such as chip patterns, the repeating patterns can be automatically analyzed by establishing analysis positions on the typical pattern. Active use of a position recognition function attached to this kind of apparatus is made in establishing the coordinates of the analysis points.

The aforementioned analysis methods and analysis conditions are characterized in that the process of the operator's trial and error is automatically recorded. Based on the recorded process, amendments and confirmations are made. Then, established analysis methods and analysis conditions are recorded.

In one feature of the present invention, optimum analysis methods and conditions are selected from the process of the operator's trial and error. Then, automated analysis can be performed.

Other objects and features of the invention will appear in the course of the description thereof, which follows.

DESCRIPTION OF THE PREFERRED EMBODIMENTS

Figure 1:
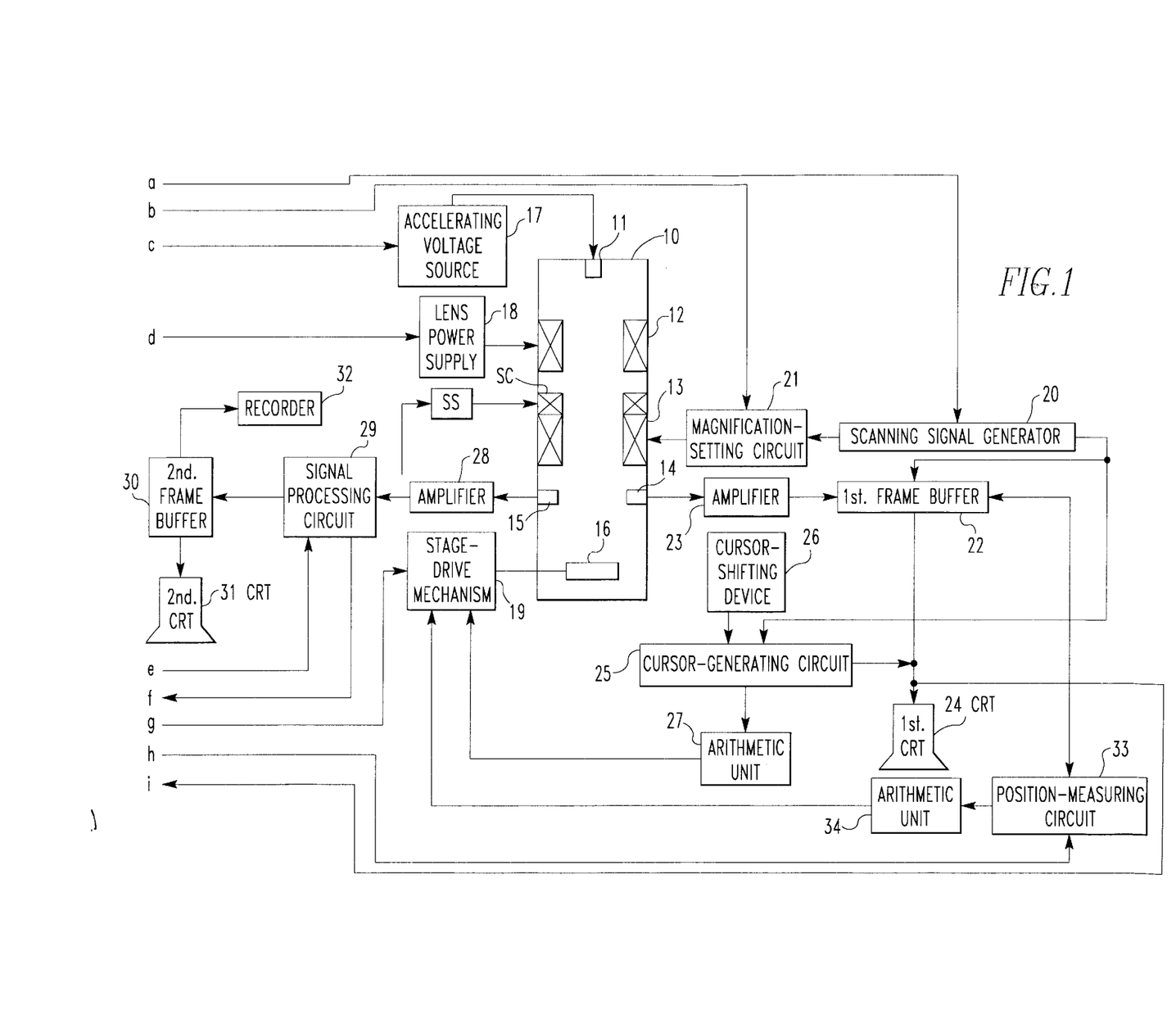
FIG. 1 is a block diagram of main portions of an automatic pattern analysis system in accordance with the present invention.

Referring to FIG. 1, there is shown an automatic pattern analysis apparatus in accordance with the present invention. This apparatus includes a scanning electron microscope (SEM) whose microscope column is indicated by numeral 10. The microscope column has an electron gun 11 emitting a beam of electrons focused by condenser lenses 12. Deflection coils 13 deflect the electron beam. Shift coils SC shift the electron beam. Secondary electrons emitted from a specimen (not shown) are detected by a secondary electron detector 14. X-rays emitted from the specimen are detected by an x-ray detector 15.

The specimen (not shown) is placed on a specimen stage 16. An accelerating voltage source 17 generates an accelerating voltage applied to the electron gun 11. A lens power supply 18 energizes the condenser lenses 12. An image shift power supply SS energizes the shift coils SC. An accelerating voltage-setting signal c is applied from a computer (not shown) to the accelerating voltage source 17. A lens power supply control signal d is applied to the lens power supply 18.

A stage-drive mechanism 19 moves the specimen stage 16. A scanning signal generator 20 generates a scanning signal. A magnification-setting circuit 21 sets the magnification of the SEM image by adjusting the amplitude of the scanning signal from the scanning signal generator 20. The computer applies a control signal a to the scanning signal generator 20. A control signal b is applied from the computer to the magnification-setting circuit 21. A first frame buffer 22 stores data about frames of images including secondary electron images, SEM images, as well as data about the scanning electron microscope. An amplifier 23 amplifies the output from the secondary electron detector 14. A first CRT 24 displays the contents of the frame buffer 22. SEM data i is sent to the computer from the first frame buffer 22.

A cursor-generating circuit 25 generates a cursor signal to display a cursor on the CRT 24. A cursor-shifting device 26 shifts the position of the cursor. An arithmetic unit 27 receives the cursor signal, calculates the coordinates of the position of the cursor and sends data about the calculated coordinates to the stage-drive mechanism 19. An amplifier 28 amplifies the output from the x-ray detector 15.

A signal-processing circuit 29, such as a multichannel analyzer (MCA), receives the output from the amplifier 28 and performs given signal processing. A second frame buffer 30 stores the output from the signal-processing circuit 29. A second CRT 31 displays the output from the frame buffer 30. A recorder 32 records the output from the frame buffer 30. The signal-processing circuit 29 receives a control signal e from the computer and sends data f to the computer, the data f being obtained by signal processing.

A foreign material position-measuring circuit 33 receives the output from the frame buffer 22 and measures the coordinates of the foreign material. An arithmetic unit 34 receives the output from the foreign material position-measuring circuit 33, performs given calculations and sends data to the stage-drive mechanism 19. This stage-drive mechanism 19 receives a stage drive-and-control signal g from the computer. The position-measuring circuit 33 receives a control signal h from the computer.

As described thus far, the system for carrying out the present invention comprises a wafer process-evaluating apparatus using an ordinary scanning electron microscope (SEM) to which an elemental analysis mechanism relying on energy-dispersive X-ray spectroscopy (EDS) is attached, the EDS using x-ray detection. The EDS analysis is an analysis using an energy-dispersive x-ray spectrometer (EDS).

Figure 2:
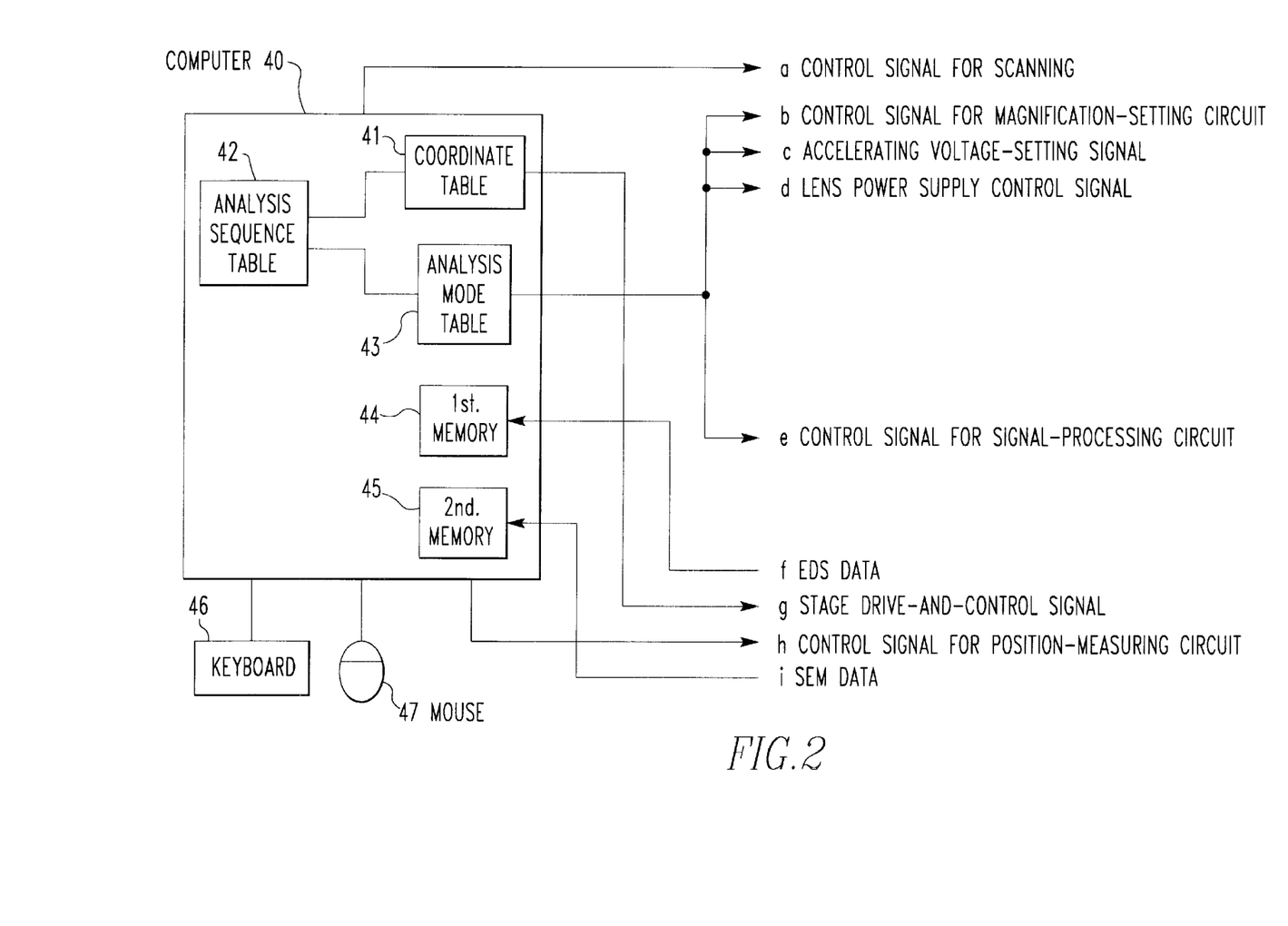
FIG. 2 is a block diagram of other portions of the automatic pattern analysis system shown in FIG. 1.

FIG. 2 is a diagram illustrating a computer 40 included in a system embodying the present invention. This computer 40 supplies the control signal a to the scanning signal generator 20 (FIG. 1), and includes a coordinate table 41 for storing data about coordinates, an analysis sequence table 42 connected with the coordinate table 41 and acting to store an analysis mode, and an analysis mode table 43 connected with the analysis sequence table 42 and supplying various control signals to the system shown in FIG. 1.

The analysis mode table 43 produces the aforementioned control signal a to the scanning signal generator 20, the magnification-setting control signal b, an accelerating voltage-setting signal c, a lens power supply control signal d, and the signal-processing circuit control signal e. First and second memories 44 and 45 store information. The first memory 44 stores the data f from the signal-processing circuit 29. The second memory 45 stores SEM data i from the frame buffer 22. A keyboard 46 is used to enter various instructions into the computer 40. A mouse 47 is employed to store the values of the coordinates of the center of the SEM image displayed on the CRT 24 in the coordinate table 41. The operation of the system constructed in this way is as follows.

The present invention comprises the wafer process-evaluating apparatus, the EDS analysis instrument, and software for operating these apparatus and instrument. The function of the software includes automatic positioning function, schedule programs, automatic stage-moving function, automatic magnification-setting function, automatic focusing function, area scanning-and-analyzing function (characteristic x-ray distribution mapping function), point analysis function, automatic qualitative and quantitative functions and identification function.

(1) Relation Between Contents of Analysis Mode and Control

The following items, such as analysis conditions and measuring method, principally associated with EDS analysis are collectively referred to as analysis mode. The analysis mode includes probe conditions indicating the energy of the electron probe (i.e., the accelerating voltage) and the probe current (i.e., the beam current intensity), scan mode indicating the scanning of the electron probe, analysis function mode indicating which of the functions of the EDS should be executed and various EDS attendant items that must be established in selecting the analysis function of the EDS. In EDS analysis, these are required to be set one by one for each point. These are described in further detail below.

(1) Probe Conditions: These set the accelerating voltage and the probe current. The accelerating voltage is controlled by the accelerating voltage-setting signal c. The probe current is controlled by the lens power supply current control signal d. Where the instrument is not so designed that when a probe current value is specified, the lens power supply is simultaneously controlled to produce the probe current value. The manner in which the lens power supply is controlled according to the desired probe current is previously found experimentally or determined by the operator's trial and error using the learning functions (described later).

(2) Scan Mode: Any one of area analysis, line analysis and point analysis is selected according to the control signal a.

The area analysis is an x-ray analysis performed while making a two-dimensional scan. This results in a two-dimensional elemental concentration distribution. In the line analysis, the start and end of the line analysis are determined. The concentration distribution of elements on the straight line connecting the two points is obtained. The point analysis is an x-ray analysis in which the electron probe is fixed at a given point. This analysis permits a qualitative analysis for examining the elemental species of existing elements in that location, a quantitative analysis for examining their concentrations and identification for examining to which one of the stored reference data items is the obtained data item closest. Where an area analysis is selected, it is necessary to establish the magnification. Where the line is expressed in terms of the distance between the start and the end or two points on a two-dimensional scanned image, the magnification of the scanned image or the distance between two points on the scanned image may be established. The magnification is controlled by the magnification-setting control signal b. In a point analysis, the probe diameter is established. The probe diameter is controlled by the lens power supply control signal d. It is necessary, however, to previously set the conditions under which the lens power supply is controlled to a desired probe diameter.

(3) Analysis Function: An analysis function, such as a qualitative analysis, a quantitative analysis or identification is selected from the software intrinsic in the EDS analysis instrument. In the case of an area analysis or a line analysis, a region of interest (ROI) output function is selected. These controls are provided by the control signal e.

(4) Attendant Items: In the case of a qualitative analysis, quantitative analysis or identification, the measuring time is established. In the case of an area analysis or line analysis, an element whose concentration distribution should be obtained is specified. Then, a region of interest (ROI) is established. This region of interest is a spectral energy range of interest by EDS. The ROI output is the integrated count of the energy range described above or the output from a counting-rate meter. These controls are provided by the control signal e.

(2) Creation and Selection of Analysis Mode

In actual analysis, the above-described analysis mode is established for each analysis point. In general, however, every combination of analysis modes is conceivable.

Therefore, it is better to previously prepare analysis modes frequently used. For this purpose, the following scheme should be adopted:

(i) Plural analysis modes whose contents have been patternized can be prepared.

(ii) The contents of the analysis modes can be modified and changed at will.

(iii) The procedure, the conditions, etc. found by the operator's trial and error can be automatically patternized. At this time, if necessary, unwanted procedures or conditions can be erased or modified. This is referred to as generation of analysis mode by learning and will be described in detail later.

(iv) When a schedule program that is used to make an actual analysis is executed, the operator selects one from the analysis modes already stored or modifies the selected mode and establishes the analysis mode. Alternatively, a new analysis mode can be created and established.

(3) Creation of Combination of Analysis Modes and Analysis Sequence Table

During execution of an actual analysis, various analysis modes, such as (1) probe conditions, (2) scan mode, (3) analysis function, (4) attendant items, etc., are combined.

For example, it is assumed that an area analysis is made to obtain two-dimensional concentration distributions of some elements (e.g., aluminum and iron) at some coordinate position (e.g., the ith coordinate of a coordinate table). At the same time, identification is made at the same coordinate position.

First, in order to make an area analysis, the (1) probe conditions are an accelerating voltage (e.g., 12 kV) and a probe current (e.g., 1 nA) adapted for an area analysis. The (2) scan mode is an area analysis. A desired scanned image magnification (e.g., 1000×) is set. ROI output is selected as the (3) analysis function. As the (4) attendant item, the ranges of ROIs corresponding to each range (e.g., two ROIs from 1.4 to 1.6 keV and from 6.2 to 6.6 keV, respectively) are established. If the analysis is executed according to the above-described settings, a scan is made for an area analysis at some magnification centered at this coordinate point. Using the specified ROI outputs, 2 two-dimensional concentration distributions of the specified elements (aluminum and iron in the above-described embodiment) are obtained.

Subsequently, for identification at the same coordinate position, the (1) probe conditions are modified. The probe current and the probe diameter are modified to a robe current (e.g., 0.1 nA) and a probe diameter (e.g., 1 $\mu$m) adapted for a point analysis while maintaining the accelerating voltage constant. The (2) scan mode is changed from the area analysis to the point analysis. As the (3) analysis function, identification is selected. As the (4) attendant item, the measuring time is set to 60 seconds, for example. After performing the analysis in this way, an EDS spectral measurement is made for a specified time at that coordinate point. Then, using an identification program that is an EDS analysis program, the obtained spectral data is compared with reference data that are EDS spectra of various materials, the EDS spectra being previously stored in memory. An output signal is produced to indicate what substance indicated by the reference data is closest to the data obtained by the measurement.

Some analytical modes are combined for one analysis point. Combinations of different analysis modes are arranged in order. These combinations of the analysis modes and the array may all be entered into the analysis sequence table 42.

The data can be conveniently put in order in this way. First, in the coordinate table 41, the order in which the analysis sequences of the analysis sequence table 42 are used are specified for each analysis point of the coordinate table 41. Then, in the analysis sequence table 42, a used combination of analysis modes of the analysis mode table 43 is specified. In the analysis mode table 43, each analysis mode specifies what function of the apparatus is selected and how it is established.

Figure 5:
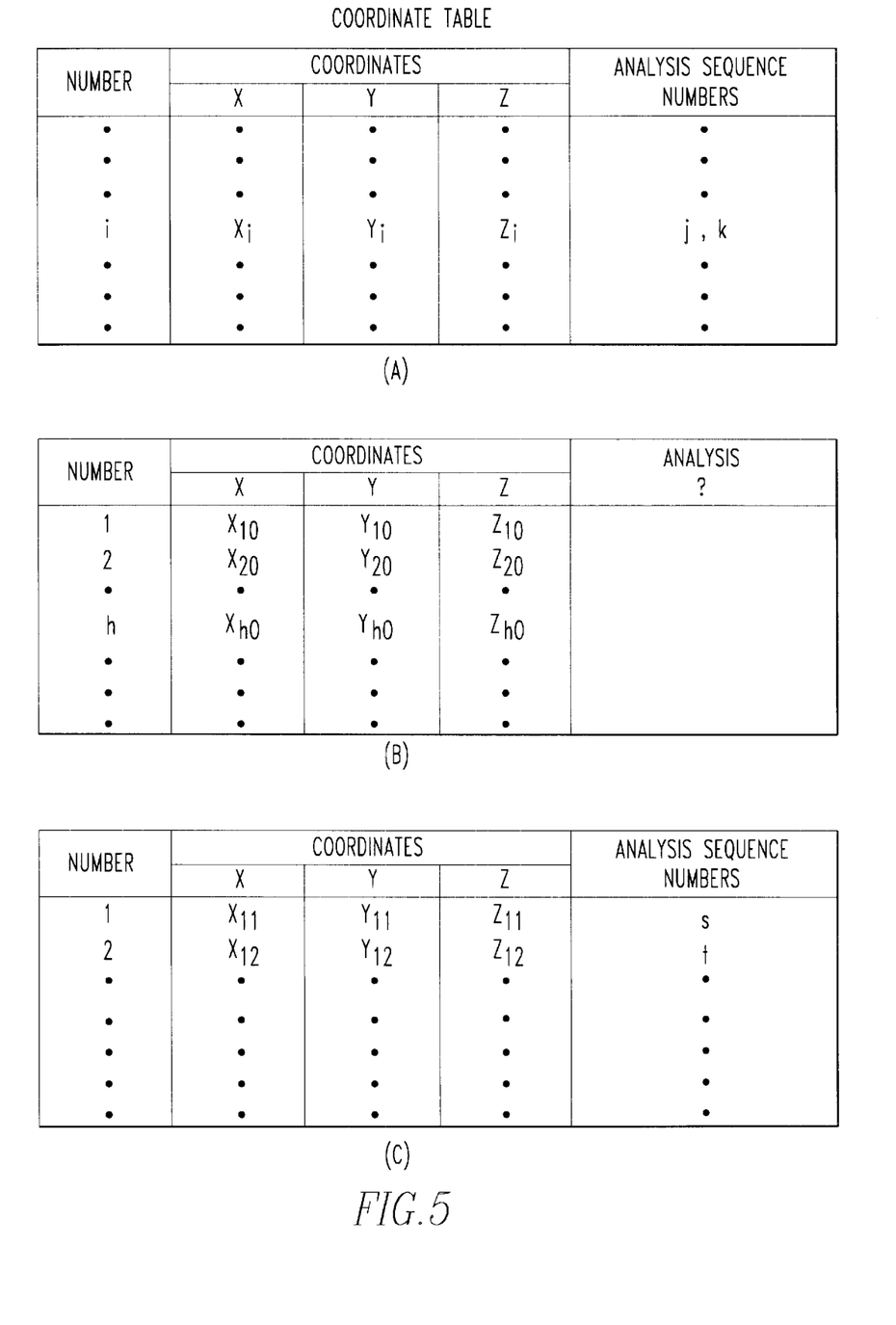
FIG. 5 shows coordinate tables in accordance with the present invention.
Figure 6:
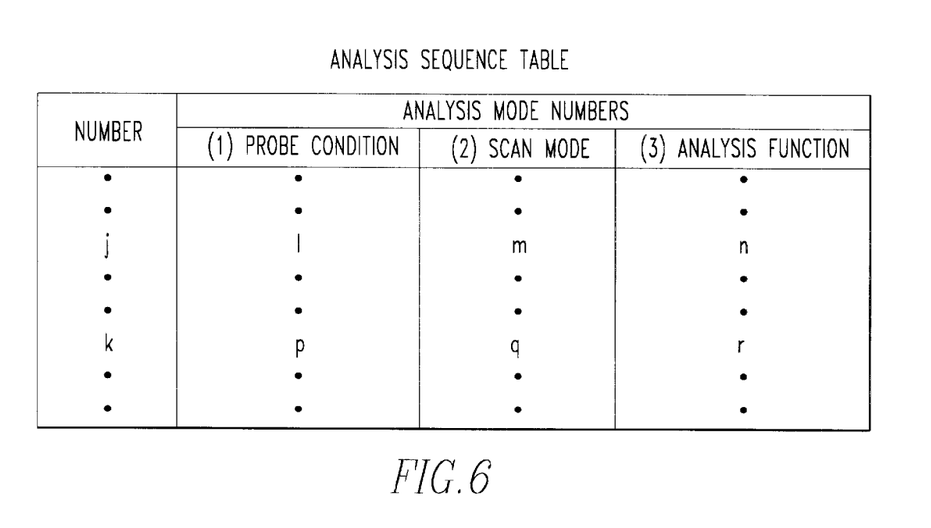
FIG. 6 is an analysis sequence table in accordance with the present invention.
Figure 7:
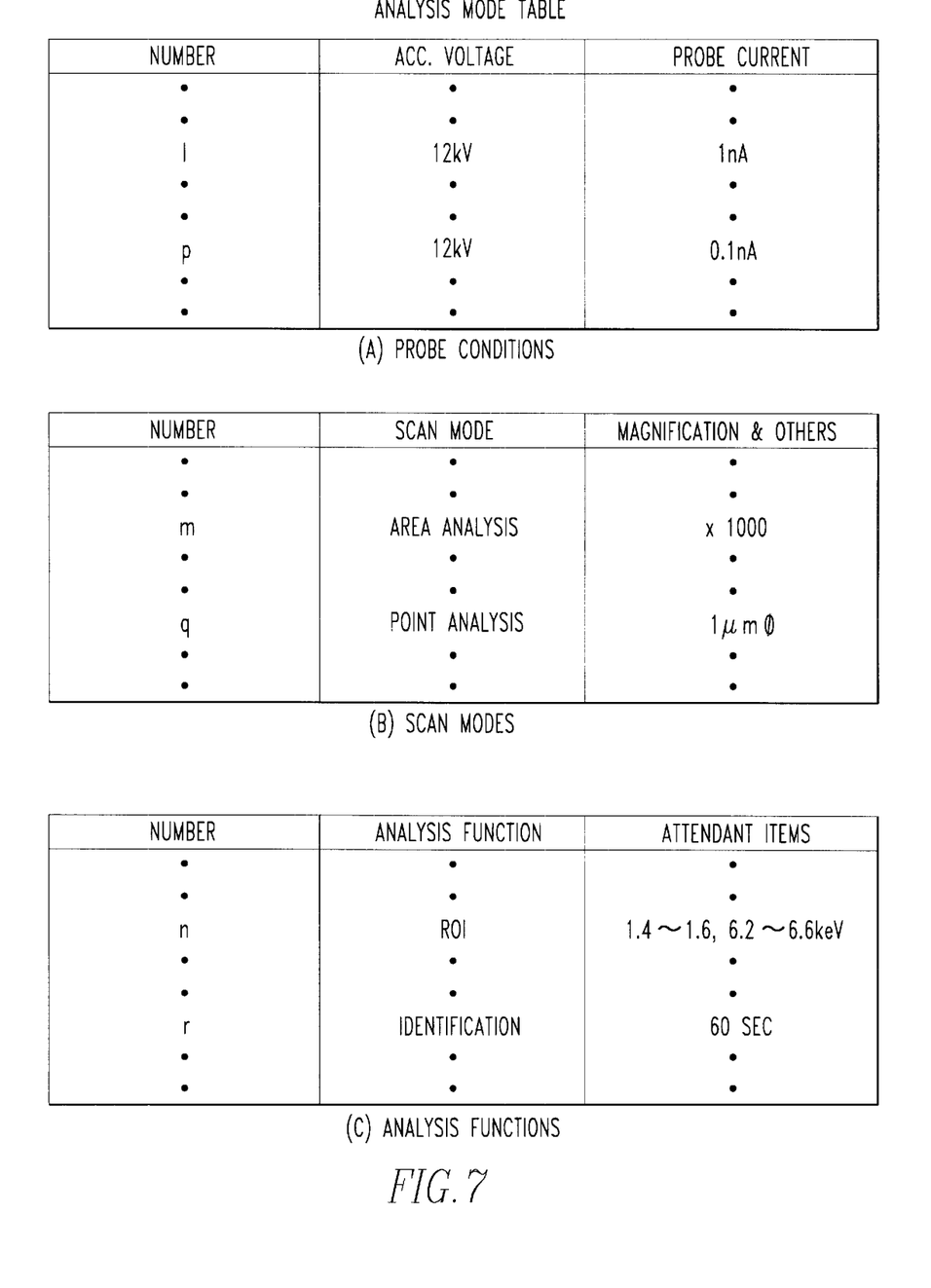
FIG. 7 shows analysis mode tables in accordance with the present invention.

The above-described examples of analysis are next described by referring to FIGS. 5(A), 6 and 7. In FIG. 5(A), the ith coordinates of the coordinate table 41 are $x_i$, $y_i$, and $z_i$. The analysis sequence numbers indicate that j and k are specified in order. Referring to the analysis sequence table 42 of FIG. 6, the (1) probe condition number indicated by the analysis sequence number j is 1. The (2) scan mode number is m. The (3) analysis function number is n. Referring next to the analysis mode table 43 of FIG. 7, it is divided into three tables of probe conditions (A), scan mode (B) and analysis function (C). In FIG. 7(A), the (1) probe condition number 1 indicated by the analysis sequence number j indicates that the accelerating voltage is set to 12 kV and the probe current is set to 1 nA. In FIG. 7(B), the (2) scan mode number m indicated by the analysis sequence number j is an area analysis mode. The magnification of the scanned image is set to 1000×. Referring to FIG. 7(C), the (3) analysis function number n indicates that ROI is selected as a function of the EDS. The attendant ROI ranges are from 1.4 to 1.6 keV and from 6.2 to 6.6 keV, respectively. Characteristic x-rays from aluminum are detected in the former range. Characteristic x-rays from irons are detected in the latter range.

In the coordinate table 41 of FIG. 5(A), the analysis sequence number k is specified subsequently to the analysis sequence number j. In the analysis sequence table 42 of FIG. 6, the (1) probe condition number indicated by the analysis sequence number k is p. The (2) scan mode number is q. The (3) analysis function number is r. Referring next to the analysis mode table 43 of FIG. 7(A), the (1) probe condition number p, indicated by the analysis sequence number k, is that the accelerating voltage remains at 12 kV but that the probe current is modified to 0.1 nA. In FIG. 7(B), the (2) scan mode number q indicated by the analysis sequence number k indicates that the mode is changed to a point analysis mode and that the diameter of the electron probe is set to 1 $\mu$m. In FIG. 7(C), the (3) analysis function number r indicated by the analysis sequence number k indicates that identification is selected as the function of the EDS and that the measuring time, or an attendant item, is set to 60 seconds.

(4) Relation Among Coordinate Position, Repeating Pattern and Coordinate Table 41

If the operator of the instrument operates the cursor-shifting device 26 to bring a foreign material into the position of the cursor while watching the SEM image on the CRT 24, the foreign material position-measuring circuit 33 determines the position of the foreign material relative to the center position of the scanned image. The results are sent to the arithmetic unit 34. Based on the results, the arithmetic unit 34 calculates the distance moved by the stage 16 to bring the foreign material into the center of the scanned image. The results are sent to the stage-drive mechanism 19. If this mechanism 19 drives the stage 16 according to the results, the foreign material is brought into the center of the scanned image. If he or she clicks the mouse 47, the coordinate position of the foreign material is recorded in the coordinate table 41.

Every coordinate position to be analyzed may be recorded in the coordinate table 41. In the case of a repeating pattern, it is better to adopt the following method. Many coordinate positions to be analyzed are recorded with one typical pattern. With respect to other repeating patterns, only a certain point is specified and its coordinates are recorded. The other coordinate positions in the repeating pattern may be determined from the relations of the coordinates of the certain point in the typical pattern to the coordinates of many other coordinates, based on the coordinates of the certain point.

Figure 12:
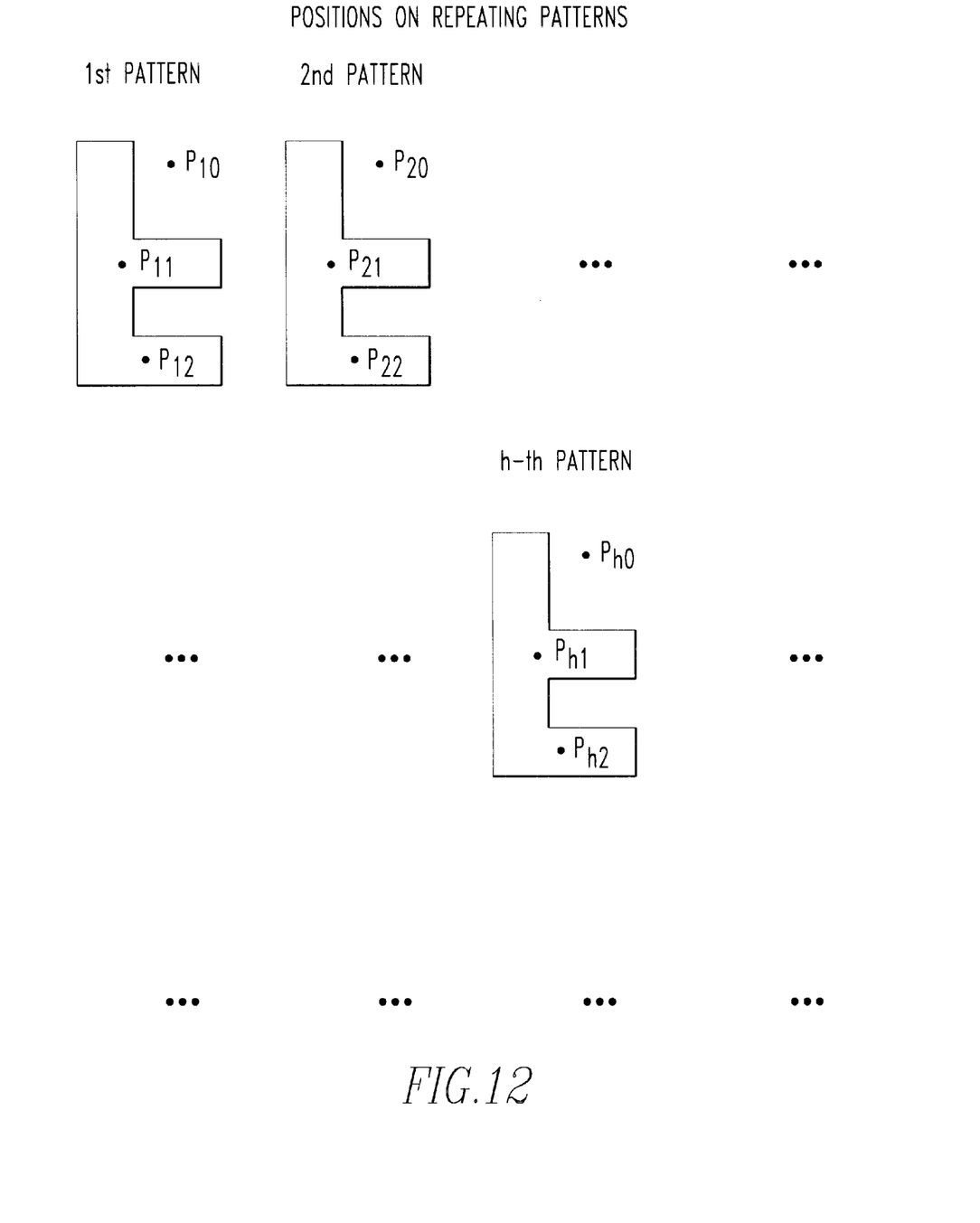
FIG. 12 is a diagram showing the coordinates of repeating patterns.

The above-described method is described in further detail by referring to FIGS. 5 and 12 to facilitate understanding the method. As shown in FIG. 5, the coordinate table 41 consists of 3 coordinate tables (A), (B) and (C). FIG. 5(A) is an ordinary coordinate table as mentioned previously. FIG. 5(B) is a repeating coordinate table for recording the above-described certain point on the repeating patterns. FIG. 5(C) is a typical coordinate table for storing many coordinate positions on the typical pattern to be analyzed. FIG. 12 is a diagram illustrating coordinates on repeating patterns.

First, the operator instructs the computer 40 to determine the relative positions of the repeating patterns, using data about a design. The result is shown in FIG. 5(B), where values $x_{10}$, $y_{10}$ and $z_{10}$ in the table indicating the coordinates in the first repeating pattern should represent a certain position (e.g., point $P_{10}$ in FIG. 12) within the first repeating pattern. In FIG. 12, coordinates $x_{ij}$, $y_{ij}$, and $z_{ij}$ are represented as $P_{ij}$. In determining coordinates, the deviations of the data about the design from the actual coordinates due to rotation of the specimen, errors in the absolute distances of the patterns on the apparatus or wafer or parallel shift are appropriately corrected. The "analysis?" column in the figure permits the operator to determine whether an analysis is performed.

Then, if the operator considers that the position to be analyzed is determined taking the first repeating pattern as a typical pattern, for example, then he or she instructs the computer 40 to move the sample into the coordinate positions $x_{10}$, $y_{10}$ and $z_{10}$ (i.e., the point $P_{10}$ in FIG. 12) while referring to the repeating coordinate table of FIG. 5(B). The operator then orders the computer 40 to start a coordinate-positioning operation on the typical pattern. He or she searches for the position to be analyzed first. The computer 40 enters the coordinate positions $x_{11}$, $y_{11}$, and $z_{11}$ into the coordinate table of FIG. 5(C). Subsequently, the operator determines coordinates in succession and stores them in the coordinate table. In particular, $x_{11}$, $y_{11}$ and $z_{11}$ are stored in the first position. Then, $x_{12}$, $y_{12}$ and $z_{12}$ are stored in the second position, and so forth. In this way, every coordinate position to be analyzed on the typical pattern is stored. The column of the analysis sequence numbers may be determined simultaneously or after the determination of the coordinate positions.

Many coordinate positions to be analyzed on the typical pattern described above are stored in the coordinate table 41, as well as the coordinates of the certain points on the other repeating patterns.

In this manner, in analyzing repeating patterns, the repeating coordinate tables of FIG. 5(B) refer to the typical coordinate table of FIG. 5(C). The actual analysis points are calculated from the values of both coordinates. The sample is moved into the coordinate positions and an analysis is made. For example, the coordinate positions, such as points $P_{21}$, $P_{22}$, ..., $P_{h1}$, $P_{h2}$, etc., in FIG. 12 are determined as described above although they do not appear explicitly in the table.

The coordinates on the certain points on each repeating pattern may be determined by observing actual repetitions, measuring the distances and calculating the coordinates from the measured distances by the computer 40 without relying on the data on design.

Figure 3:
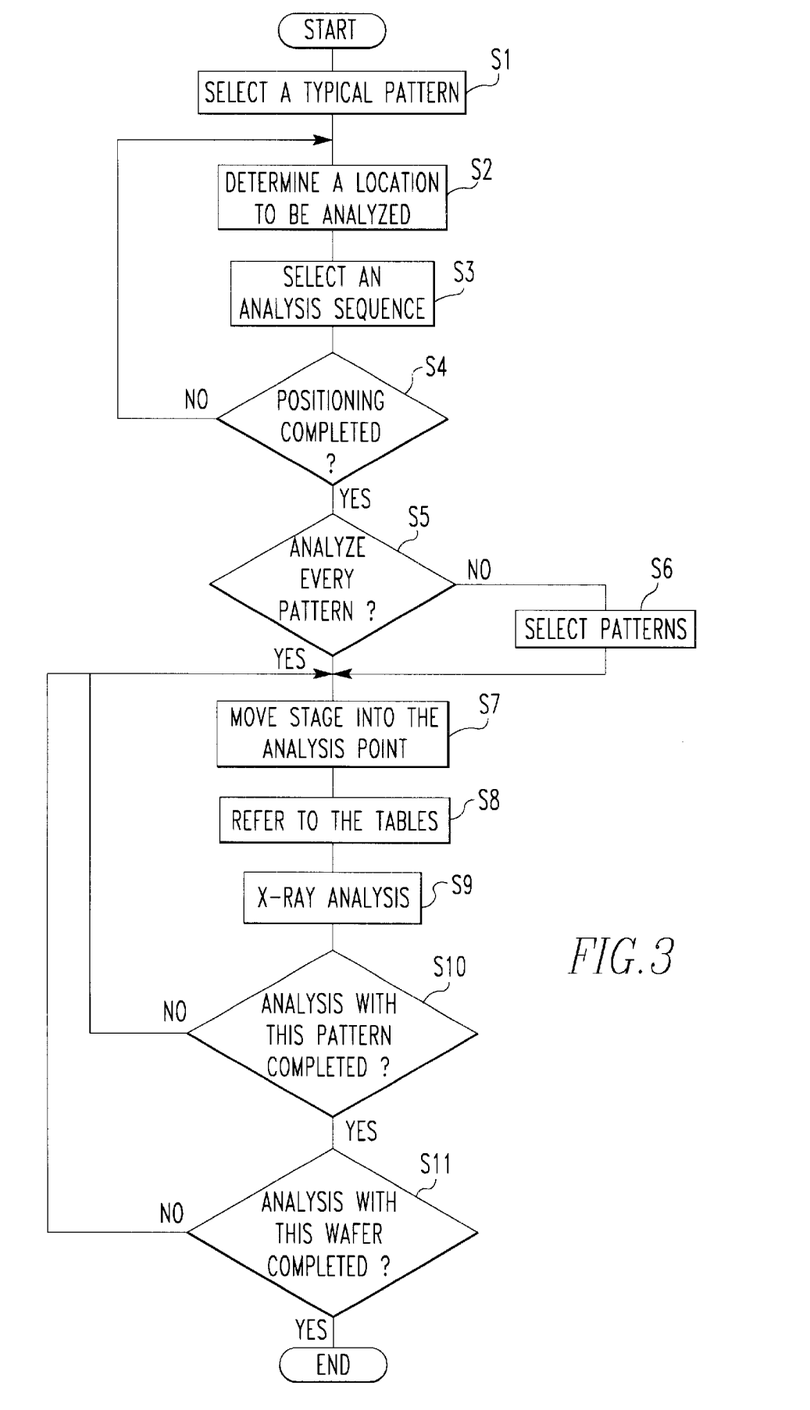
FIG. 3 is a flowchart illustrating general operations for performing an analysis in accordance with the present invention.

FIG. 3 is a flowchart illustrating a general analysis operation according to the present invention. First, the operator of the instrument displays the pattern image on the CRT 24 and selects a typical pattern (step 1). The image may be a SEM image displayed on a real-time basis or a SEM image reproduced by the computer 40 from the image previously stored in the second memory 45.

Then, the operator searches the typical pattern for a location to be analyzed and operates the cursor-shifting device 26 to bring the cursor into the analysis point. The coordinates of the position are entered into the coordinate table 41 via the computer 40. If the coordinates of a location becoming a candidate location to be analyzed are already present in the coordinate table 41, the computer 40 refers to the coordinate table 41 and displays the image at that location and its position on the CRT 24. The operator watches them, finally determines whether each location should be analyzed and enters data indicating whether each location should be analyzed into the coordinate table 41 (step 2).

Then, the computer 40 reads the analysis sequences from the analysis sequence table 42 and displays them. The operator selects an optimum analysis sequence from the displayed sequences (step 3). It is assumed that analysis sequences and analysis modes necessary for analyses are already in the analysis sequence table 42 and in the analysis mode table 43.

The computer 40 displays a menu of options to ask the operator if the positioning operation has completed. The operator checks if there remains any locations to be analyzed. The operator replies to the computer 40 (step 4). If the operation is not completed, control goes to step 2, where a location to be analyzed next is searched.

If the positioning operation is completed, the computer 40 displays a menu of options to ask the operator whether analyses are made with every repeating pattern. The operator makes a decision and replies to the computer 40 (step 5). If only certain patterns rather than all patterns should be analyzed, the operator sorts the patterns and determines whether they should be analyzed. The results are successively entered into the coordinate table 41 (step 6). The coordinates of the certain points in the repeating patterns have been previously calculated automatically by the computer 40 and stored in memory.

Actual analyses are performed in the manner described now. If all or selected patterns are analyzed, the computer 40 refers to the coordinate table 41 and moves the stage 16 into the analysis position (step 7).

Then, the computer 40 refers to the analysis sequence table 42 according to instructions from the coordinate table 41, and refers to the analysis mode table 43 according to instructions from the analysis sequence table 42 and establishes analysis conditions (step 8).

Thereafter, an x-ray analysis, such as an EDS analysis, is performed (step 9). Then, the computer checks if the analysis with this pattern is complete (step 10). If it is not complete, control goes back to step 7, where the stage 16 is moved into the coordinates of the location to be analyzed next.

If the analysis with this pattern is complete, a check is made to see if the analysis with this wafer is complete (step 11). If the analysis is not complete, control returns to step 7, where the stage 16 is moved into the coordinates of the repeating pattern to be analyzed next. If the analysis is complete, the processing is ended.

In this embodiment, if the positional relation is a repeating pattern, such as a chip pattern, automatic analysis of the repeating pattern can be performed by establishing the analysis position on a typical pattern.

In the above description, a three-tier table having coordinate tables, analysis sequence tables and analysis mode tables is used. A two-tier table may also be generated by combining the latter two into one. Furthermore, a four-tier table may be created. The inside of the table may be divided into parts according to the contents.

Figure 4:
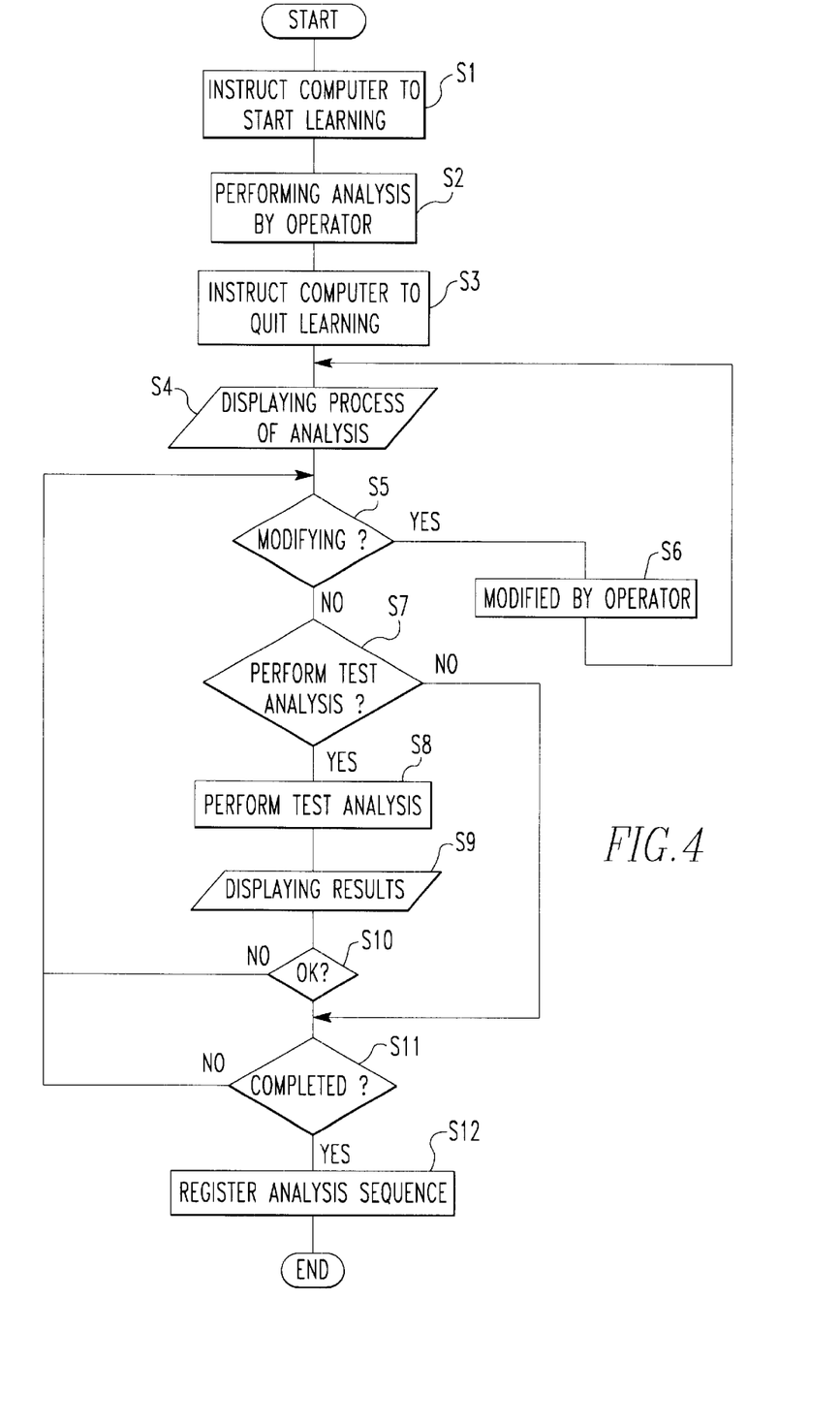
FIG. 4 is a flowchart illustrating a subroutine for learning.

In the present invention, the learning functions can be given to x-ray analysis. FIG. 4 is a flowchart illustrating the learning operation according to the present invention. First, the operator instructs the computer 40 to start learning via the keyboard 46 (step 1). Then, the operator performs analyses via the computer 40 (step 2). The process of the analysis during this operation is subsequently stored in given blocks of a memory. After completing the analysis, the operator operates the keyboard 46 to cause the computer 40 to command the end of the learning (step 3).

The computer 40 receiving LEARNING END instructions displays the process of the analysis previously stored on the CRT 31 (step 4). The operator refers to the display of the operation process obtained thus far and checks if any amendment is necessary (i.e., if there exists either erasure of unwanted operations or conditions that are considered to be modified) (step 5). If it is necessary to make an amendment, the operator erases unwanted operations or modifies those conditions (step 6).

If it is not necessary to make any amendment, a check is made to see if a test analysis should be performed (step 7). If it is necessary to make a test, the test analysis is performed (step 8). The results are displayed on the CRT 31 (step 9). The operator refers to the results and checks if the results are good or not (step 10). If the results are not good, the operator enters instructions from the keyboard 46 to return to step 5, where the amendment is redone.

If the results of the test are satisfactory, the computer 40 checks if the learning processing is complete. If an instruction indicating a good result is received from the operator, the analysis sequences and analysis modes used thus far are registered in the analysis sequence table 42 and in the analysis mode table 43 (step 12). If necessary, the coordinates of the analysis points used for the learning are also registered in the coordinate table 41.

Figure 8:
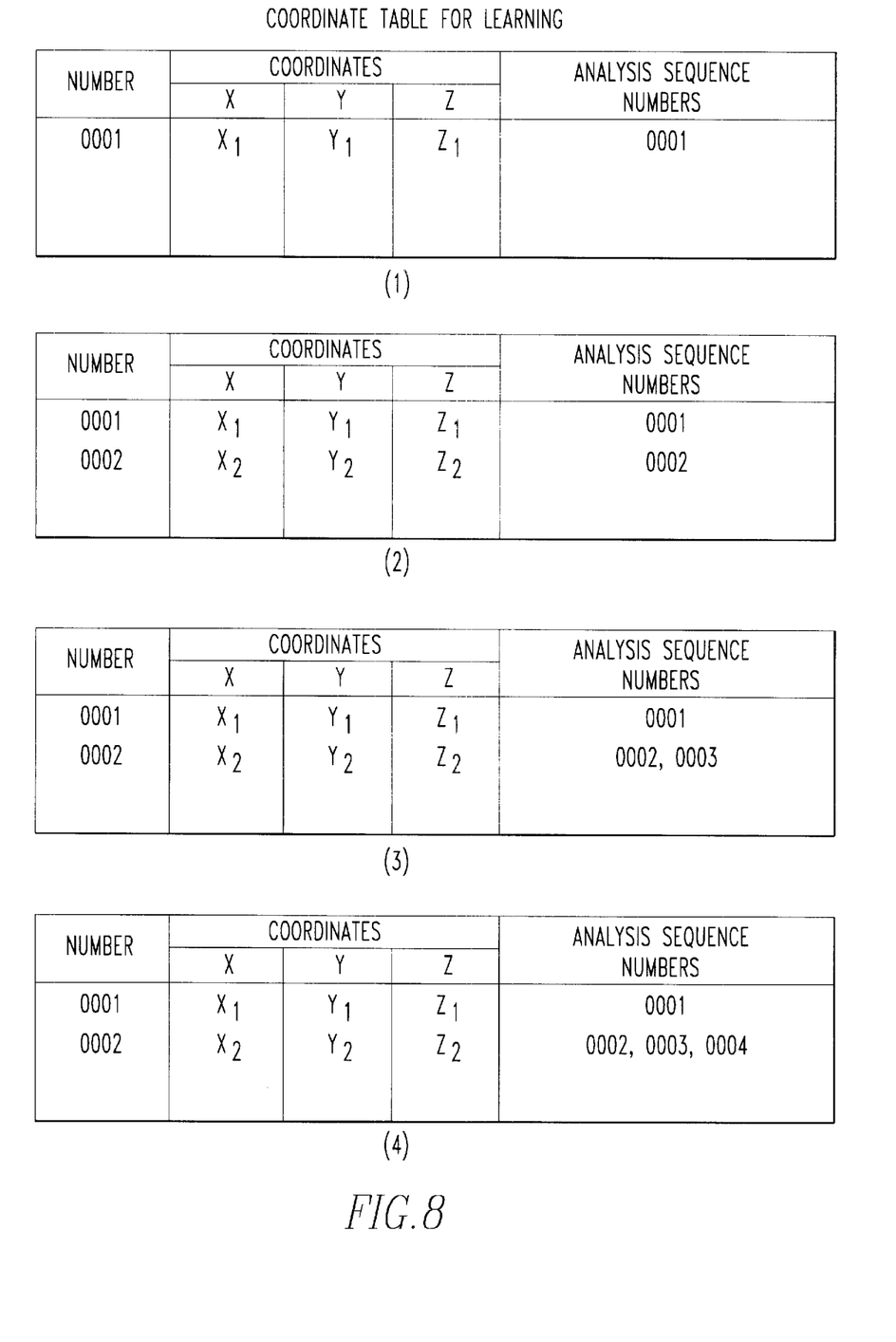
FIG. 8 shows coordinate tables for learning in accordance with the present invention.
Figure 9:
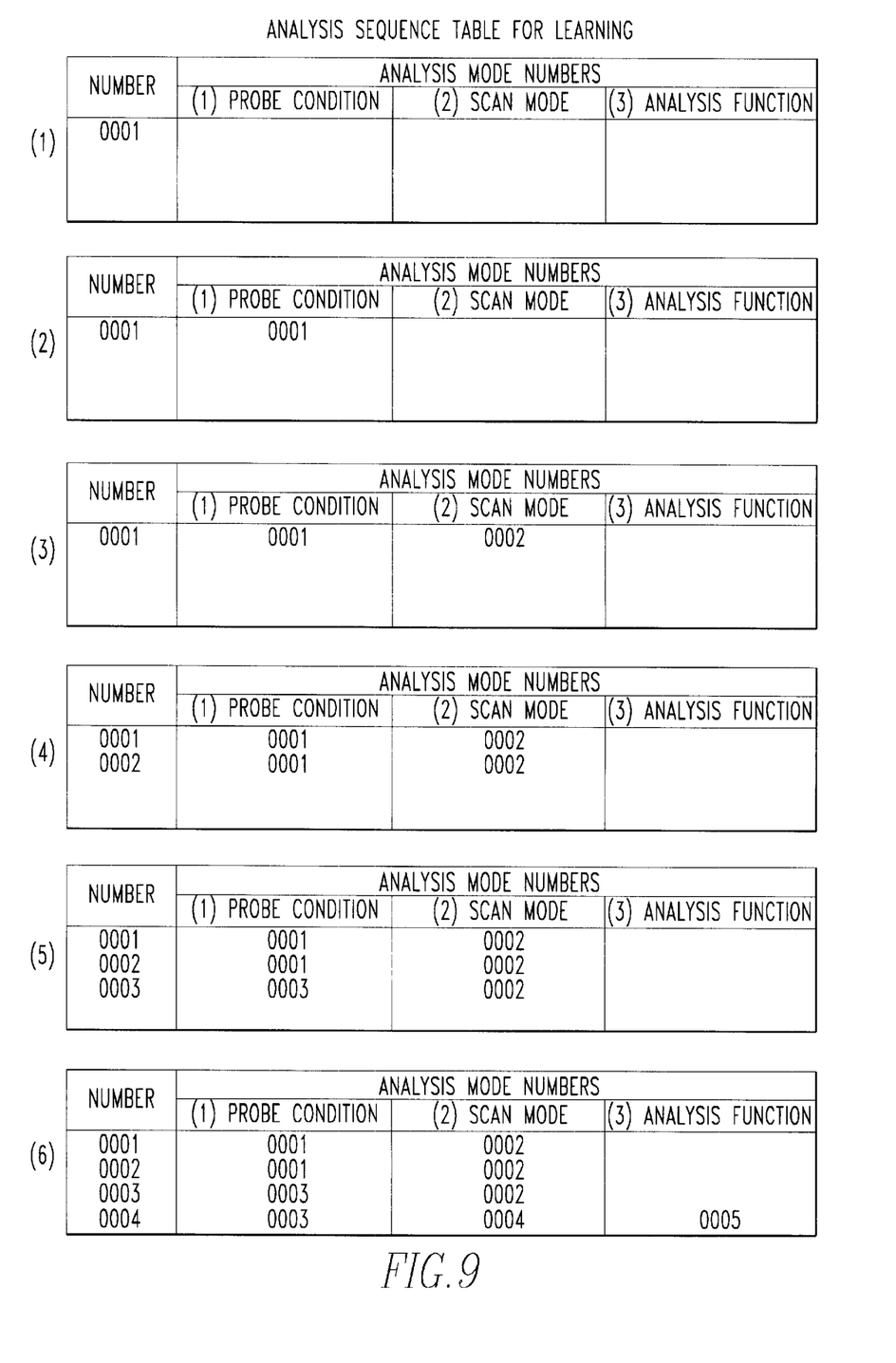
FIG. 9 shows analysis sequence tables for learning in accordance with the present invention.
Figure 10:
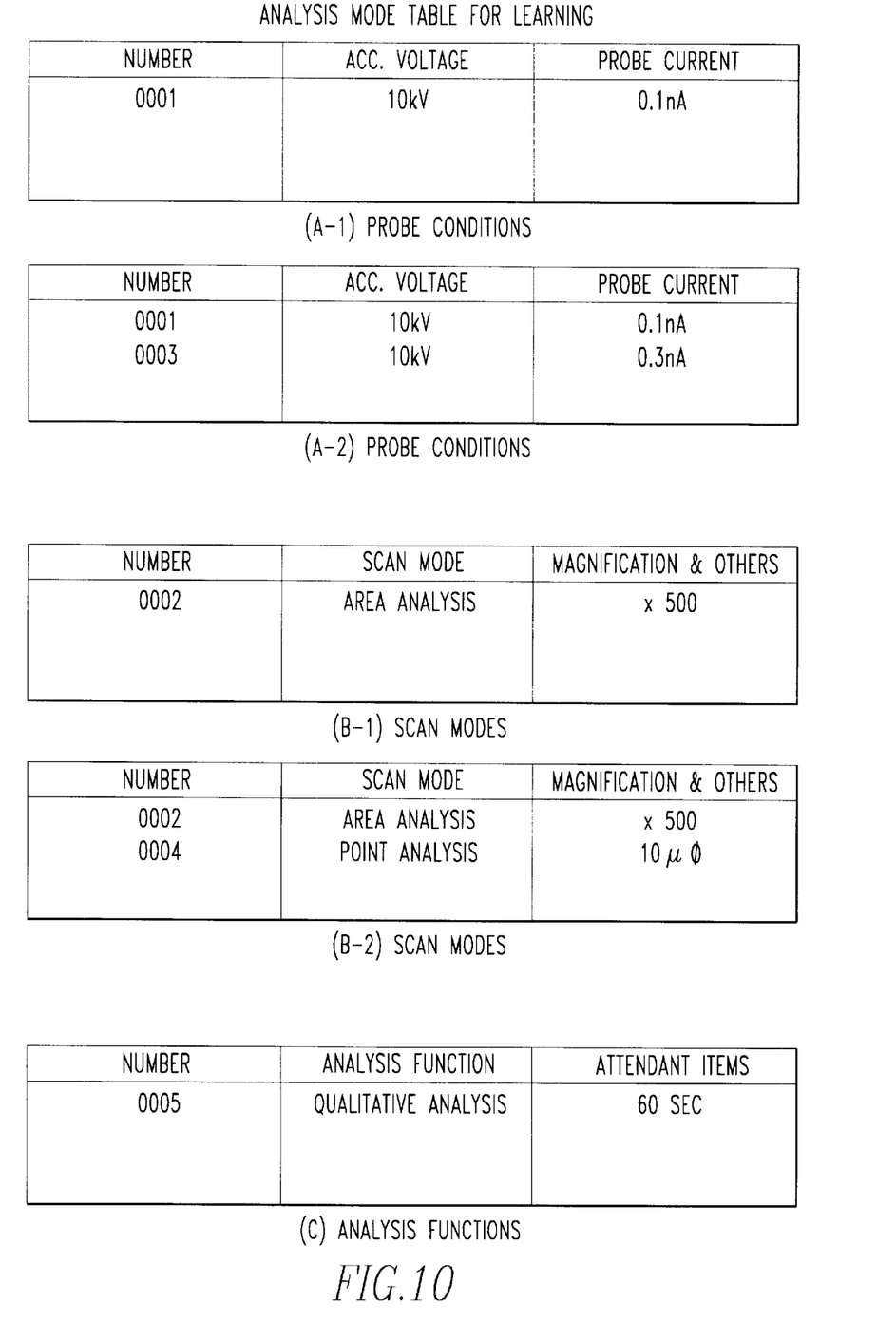
FIG. 10 shows analysis mode tables for learning in accordance with the present invention.
Figure 11:
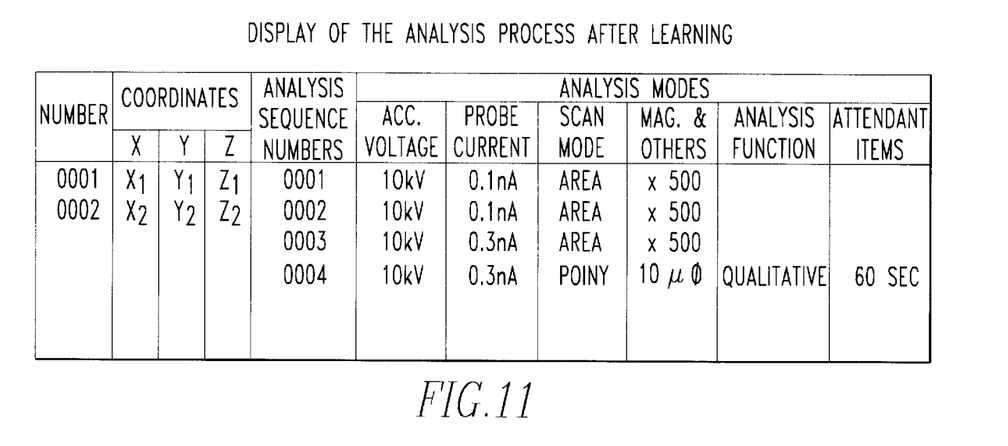
FIG. 11 is a table representative of a display of the process of learning in accordance with the present invention.

A method of recording the process of learning operations in the aforementioned storage locations is described by referring to the tables of FIGS. 8, 9 and 10. These tables are similar in form to the coordinate tables of FIG. 5, the analysis sequence tables of FIG. 6 and the analysis mode tables of FIG. 7, respectively. These tables are referred to as a table of coordinates for learning, an analysis sequence table for learning and an analysis mode table for learning, respectively. FIG. 11 gives an example of display of the process of an analysis after learning.

When the operator commands start of learning, the computer 40 automatically enters "0001" into the first column of the numbers of the coordinate table for learning. Values of coordinates $x_1$, $y_1$ and $z_1$ are put into the coordinates of the present position and "0001" is put into the column of the analysis sequence numbers (FIG. 8(1)). The computer enters "0001" into the first column of the numbers of the analysis sequence table for learning (FIG. 9(1)). Note that the other columns (i.e., probe conditions (1), scan mode (2) and analysis functions (3)) remain empty. Similarly, the columns of the analysis mode table for learning remain empty.

If the operator orders the computer 40 to set the accelerating voltage to 10 kV and the probe current to 0.1 nA for the first operation, the computer 40 makes these settings. The computer 40 enters "0001" into the first column of the probe conditions (1) of the analysis sequence tables for learning (FIG. 9(2)). The computer enters "0001" into the first column of the probe condition numbers of the analysis mode tables for learning. In addition, the computer enters 10 kV and 0.1 nA into the first columns of the accelerating voltage and the probe current, respectively (FIG. 10(A-1)).

If the operator gives instructions to set the scan mode to a 500× area analysis, the computer 40 makes this setting. The computer enters "0002" into the empty first column of the numbers of the (2) scan mode of the analysis sequence tables for learning (FIG. 9(3)). Correspondingly, the computer enters "area analysis" into the column of the scan mode and places "500×" into the column of magnification etc. (FIG. 10(B-1)).

If the operator moves the position of the specimen via the computer 40, it enters an incremented value, or 0002, into the next column of the numbers of the coordinate table for learning. The computer enters $X_2$, $y_2$ and $z_2$ that are values of the coordinates of the currently updated present position into the columns of the coordinates. The computer enters an incremented value, or 0002, into the column of the analysis sequence (FIG. 8(2)). Furthermore, the computer writes "0002" as a number in the analysis sequence table for learning. The column of the previous number, or the analysis mode number of the 0001 column, is directly copied as the analysis mode number (FIG. 9(4)).

If the operator subsequently instructs the computer 40 to change the probe current to 0.3 nA, the computer 40 enters an incremented value "0003" into the column of the analysis sequence numbers of the coordinate table for learning (FIG. 8(3)). The column of the numbers of the (1) probe conditions is written as 0003 that is obtained by incrementing the column of the probe conditions. The columns of the previous numbers, or the analysis mode numbers of the column 0002, are directly copied into the other columns (FIG. 9(5)). The column of the probe condition numbers of the analysis mode table for learning is written as 0003. With respect to the accelerating voltage, 10 kV in the previous column is directly copied. The probe current is written as 0.3 nA (FIG. 10(A-2)).

If the operator instructs the computer 40 to set up a 60-s EDS qualitative analysis with a probe having a diameter of 10 μm, the computer 40 sets the electron probe to 10 μm in diameter, the analysis function of the EDS to a qualitative analysis and the measuring time to 60 seconds. An incremented value 0004 is placed into the column of the analysis sequence numbers of the coordinate table for learning (FIG. 8(4)). The number of the analysis sequence table for learning is written also as 0004. With respect to the analysis mode numbers, the column of the previous number, or the probe condition number of 0003, is directly copied into the column of the (1) probe conditions. An incremented value 0004 is written as the (2) scan mode number. A further incremented value 0005 is written as the (3) analysis function number (FIG. 9(6)). The column of the scan mode numbers of the scanning mode table for learning is written as 0004. The scan mode is written as point analysis. The magnification etc. are written as 10 μm in diameter (FIG. 10(B-2)). The column of the analysis function numbers is similarly written as 0005. The analysis function is written as qualitative analysis. The attendant items are written as 60 seconds (FIG. 10(C)).

If the operator instructs the computer to set the analysis methods and the analysis conditions in succession in this way, the computer 40 sets them. The columns of the tables are filled while making correspondence of the reference numbers. FIG. 11 gives an example of the display of the above-described analysis process after the end of learning. For convenience of illustration, three tables for learning are prepared. Similar processing can be performed if such tables are not present.

In this embodiment, the process of the operator's trial and error is automatically recorded for analysis methods and analysis conditions. Based on the recorded processes, amendments and confirmations are made. The results are recorded. In this way, automatic analysis can be performed by selecting optimum method and conditions from the process of the operator's trial and error for analysis methods and analysis conditions.

In the above description, the operator commands start and end of learning for convenience of illustration. The possibility that the operator inadvertently fails to command start of learning can be eliminated by the following method. The computer constantly records the process of operations. If necessary, the operator displays past processes of operations and extracts an arbitrary process of operations. Finally, an editing operation is performed based on the extracted process.

In the description provided above, tables for learning are prepared. These tables are not essential for the same reason. The coordinate table 41, the analysis sequence table 42 and the analysis mode table 43 already present may be employed.

In the above embodiment, an EDS method is used as an x-ray analysis method. The present invention is not limited to this. The invention can be similarly applied to other kinds of x-ray analysis methods, such as a WDS (wavelength-dispersive x-ray spectrometer).

As described in detail thus far, in the present invention, one typical pattern is selected from many repeating patterns. On this typical pattern, an analysis point, an analysis method and analysis conditions are determined. On the other patterns, automatic analysis is made at points having the same positional relation as the analysis point determined on the typical pattern by the analysis methods and analysis conditions determined for the typical pattern. Where the positional relation is a repeating pattern, such as a chip pattern, an analysis position is established on the typical pattern. An automatic analysis can be performed with the repeating pattern.

In this case, the process of the operator's trial and error is automatically recorded. Based on the recordings, amendments and confirmations are made. Then, established analysis methods and analysis conditions are recorded. Therefore, optimum methods and conditions are selected from the process of the operator's trial and error for analysis methods and analysis conditions. Thus, automated analysis is possible.

Having thus described my invention with the detail and particularity required by the Patent Laws, what is desired protected by Letters Patent is set forth in the following claims.

What is claimed is:

1. A method of automatically analyzing defects on patterns on a wafer having repeating fundamental patterns which are positioned based on design data and whose repeating rule may be determined by observing actual repetitions or the design data on a surface thereof, directing a focused electron beam at defects on the repeating patterns on the wafer one after the other to emit x-rays from defects on the surface of the wafer, and detecting the emitted x-rays for elemental analysis of said defects, said method comprising the steps of:

manually selecting one fundamental pattern on said wafer as a typical pattern;

manually determining analysis points to be regarded as defects on said typical pattern, and analysis methods, and analysis conditions associated respectively with said analysis points on said typical pattern;

storing plural positional coordinates of the determined analysis points on said typical pattern, analysis methods, and analysis conditions in a memory;

automatically calculating coordinates of corresponding analysis points on other patterns from said repeating rule and said position coordinates on said typical pattern in said memory; and with said calculated coordinates of corresponding analysis points on other patterns, performing automatic analysis on other patterns at points having the same positional relation as said analysis points determined on said typical pattern with the analysis methods and analysis conditions determined for said typical pattern.

2. The method of claim 1, wherein coordinates of said analysis points, analysis methods, and analysis conditions determined on said typical pattern are stored as tables.

3. The method of claim 1 or 2, wherein said analysis methods and analysis conditions are recorded after automatically recording a process of the operator's trial and error, making amendments, making confirmations, and establishing the analysis methods and analysis conditions.

4. The method of claim 2, wherein said tables are two or more tier-tables.

5. The method of claim 4, wherein quotation numbers for quoting at least a second table are recorded in a table of the first tier of the two-tier tables, and wherein coordinates of each analysis point, analysis methods, and analysis conditions that are not recorded in the first-tier table are recorded in the second-tier table.

6. The method of claim 4, wherein quotation numbers for quoting coordinates of each analysis point and the second table are recorded in the first-tier table, and wherein the analysis methods and analysis conditions are recorded in the second-tier table.

7. The method of claim 4, 5 or 6, wherein said analysis methods and analysis conditions are recorded after automatically recording a process of the operator's trial and error, making amendments, making confirmations, and establishing the analysis methods and analysis conditions.

8. The method of claim 2, wherein:

(A) said tables are three or more tier-tables;

(B) quotation numbers for quoting coordinates of each analysis point and a second table are recorded in the first-tier table;

(C) a quotation number for quoting a third table is recorded in the second-tier table; and (D) analysis methods and analysis conditions for controlling an apparatus are recorded in the third-tier table.

9. The method of claim 8, wherein said analysis methods and analysis conditions are recorded after automatically recording a process of the operator's trial and error, making amendments, making confirmations, and establishing the analysis methods and analysis conditions.

* * * * *

UNITED STATES PATENT AND TRADEMARK OFFICE
CERTIFICATE OF CORRECTION

PATENT NO. : 6,532,300 B1
DATED : March 11, 2003
INVENTOR(S) : Osamu Noda

It is certified that error appears in the above-identified patent and that said Letters Patent is hereby corrected as shown below:

<u>Title page,</u>
Item [56], References Cited, U.S PATENT DOCUMENTS, insert:
-- 5,119,436 A  *   6/1992    Holdgrafer ...............382/146
   5,357,110 A  *   10/1994   Statham .................. 250/307
   5,550,372 A  *   8/1996    Yasue ..................... 250/310
   5,986,263 A  *   11/1999   Hiroi et al. ................ 250/310
   5,991,699 A  *   11/1999   Kulkarni et al. ........... 438/10
   6,028,664 A  *   2/2000    Cheng et al. .............. 382/149
   6,172,363 A  *   1/2001    Shinada et al. ............ 250/307 --

<u>Column 5,</u>
Line 47, "robe current" should read -- probe current --.

<u>Column 10,</u>
Line 23, "$X_2$" should read -- $x_2$ --.

Signed and Sealed this

Twenty-third Day of September, 2003

JAMES E. ROGAN
*Director of the United States Patent and Trademark Office*